Jan. 17, 1956　　　　H. V. JAMES　　　　2,730,764
TIRE RECAPPING MACHINES
Filed March 10, 1952　　　　　　　　　　2 Sheets-Sheet 1

Inventor
HAROLD V. JAMES
By
Attorney

Jan. 17, 1956  H. V. JAMES  2,730,764
TIRE RECAPPING MACHINES
Filed March 10, 1952  2 Sheets-Sheet 2

Inventor
HAROLD V. JAMES
By
Attorney

United States Patent Office 2,730,764
Patented Jan. 17, 1956

2,730,764
TIRE RECAPPING MACHINES

Harold V. James, Littleton, Colo., assignor to O. K. Rubber, Inc., Littleton, Colo., a corporation of Colorado Application March 10, 1952, Serial No. 275,756

4 Claims. (Cl. 18—18)

This invention relates to a tire molding and curing device for molding and curing a tread on a pneumatic tire casing, and is more particularly designed as an improvement over applicant's prior Patents Nos. 2,228,316; 2,411,687; and 2,456,063.

The principal object of the invention is to provide a variably heated tire tread mold which will subject the side walls of the tire to less heat than the thick tread portion thereof, so as to maintain a uniform curing action throughout the entire cross-section of the tread.

Another object of the invention is to provide means for mounting electric heating units in a tire tread mold which will hold the unit in uniform, resilient contact with the mold or matrix throughout the entire length of the latter, and which will automatically accommodate temperature expansion of the mold and matrix.

A still further object is to provide an improved means for mounting the mold matrixes in their supporting frame so that they can expand and contract without affecting the perfect circle of the mold and without damage to either the matrix or its support, and so that the matrixes can be quickly and easily removed from and replaced in the support.

Other objects and advantages reside in the detail construction of the invention, which is designed for simplicity, economy, and efficiency. These will become more apparent from the following description.

In the following detailed description of the invention, reference is had to the accompanying drawing, which forms a part hereof. Like numerals refer to like parts in all views of the drawing and throughout the description.

Figure 1:
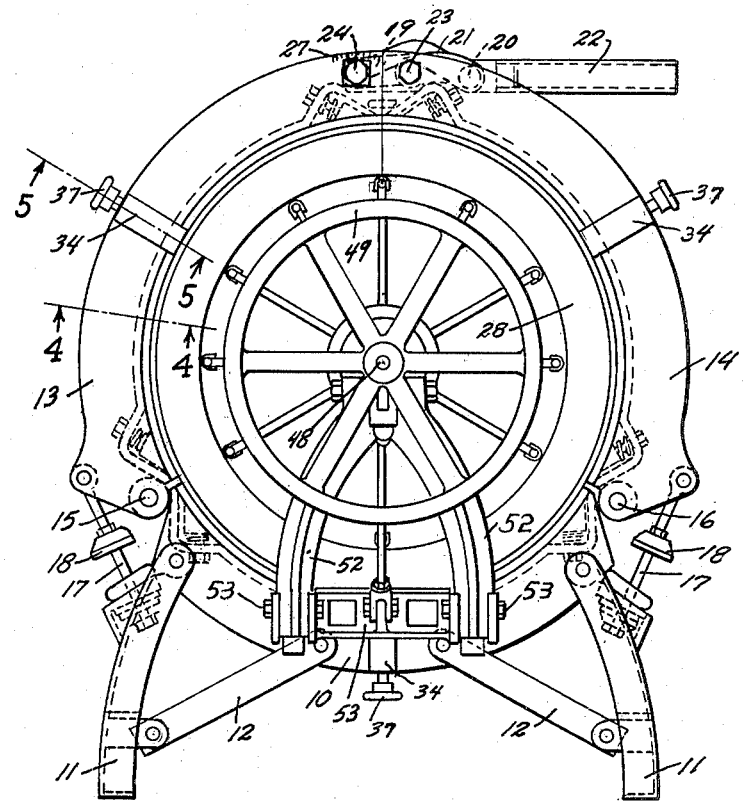
Fig. 1 is a side view of the improved tire molding and curing device.

The improved tire molding and curing device employs a lower, arcuate frame member 10 supported on suitable leg brackets 11 and braced by means of angle brace bars 12. Two arcuate side frame members 13 and 14 are hingedly secured at the extremities of the lower frame member 10 by means of suitable hinge pins 15 and 16, respectively. Each frame member comprises substantially 120° of the complete circle formed by the three joined members. The opening and closing movements of the two side members are cushioned by means of plunger rods 17 and rubber cushions 18.

The two side frame members may be drawn together and locked at the top of the device by means of a locking link 19. One extremity of the locking link 19 is mounted upon a hinge pin 20 between the furcations of a bifurcated lever member 21 provided with a lever handle 22. The bifurcated lever member 21 is hingedly mounted at one extremity on a hinge pin 23 mounted in the upper extremity of the frame member 14. The locking link 19 is connected to the upper extremity of the frame member 13 by means of a withdrawable eccentric pin 24.

Figure 2:
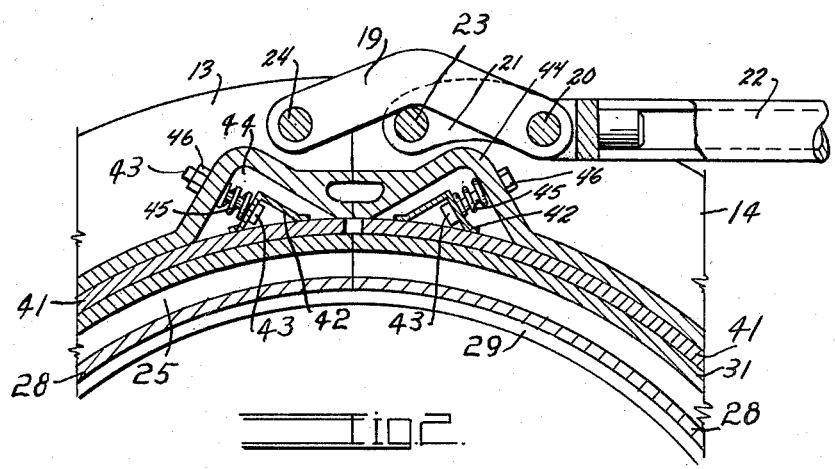
Fig. 2 is an enlarged, vertical, longitudinal, fragmentary section through the upper portion of the device of Fig. 1, taken on the line 2—2, Fig. 3.
Figure 3:
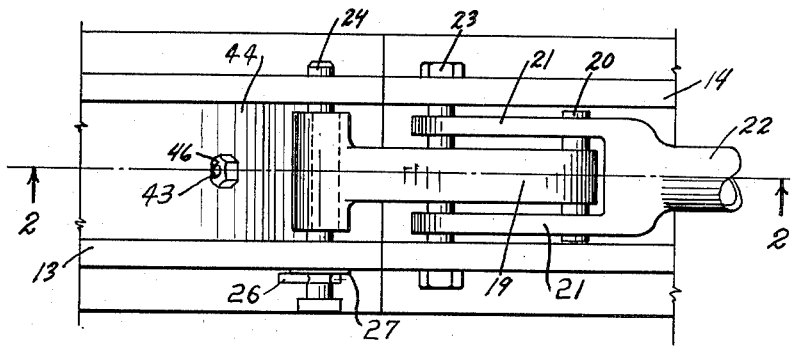
Fig. 3 is a similarly enlarged, fragmentary view of the upper portion of Fig. 1.
Figure 4:
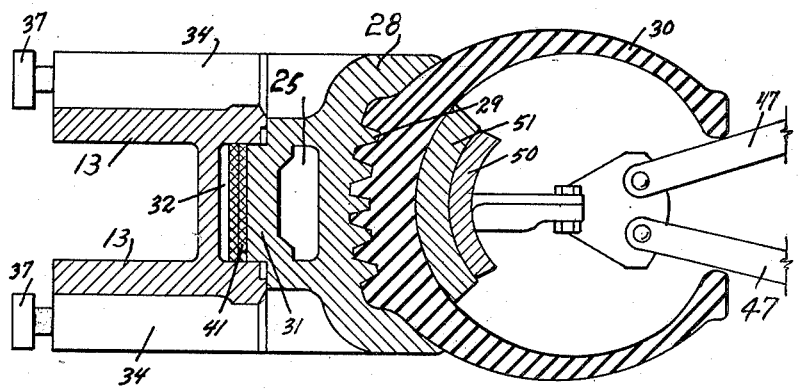
Fig. 4 is a similarly enlarged section through a matrix and frame employed in the device, taken on the line 4—4, Fig. 1.
Figures 5, 6:
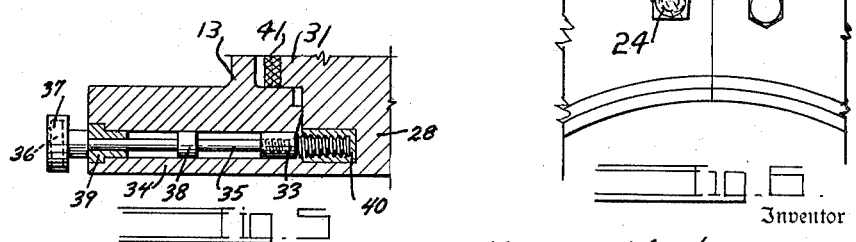
Fig. 5 is a still further enlarged, fragmentary section, taken on the line 5—5, Fig. 1.
Fig. 6 is a fragmentary, enlarged, detail view of the upper portion of Fig. 1.

It can be seen that when the lever handle 22 is swung to the right and downwardly to the position shown in Fig. 2, it will cause the link 19 to pull the pin 24 and the frame section 13 toward the section 14 until the hinge pin 20 moves below the aligned centers of the pins 23 and 24, when the device will be automatically locked in the closed position. The two sections 13 and 14 can be swung away from each other by completely withdrawing the eccentric pin 24. The purpose of the eccentricity of the pin 24 will be later described.

The frame members 10, 13, and 14 support arcuate matrixes 28 formed of a suitable heat-conducting metal, such as aluminum. The inner faces of the matrixes are engraved in any suitable design 29 to form the tread design on a tire casing, such as indicated at 30.

Each of the matrixes is formed with an outwardly projecting shoulder portion 31 which fits into an arcuate socket 32 formed on the inner faces of the adjacent frame member. Each matrix is provided at opposite sides of its middle with outwardly projecting, internally threaded studs 33. The studs extend into radially positioned, tubular sleeves 34 formed on the opposite sides of each of the frame members at the middles thereof.

A threaded clamping rod 35 is axially positioned in each sleeve 34 and terminates exteriorally in a hand grip knob 36, preferably covered by means of a rubber cap 37. The inner extremity of each threaded rod 35 is adapted to be threaded into one of the studs 33. A stop shoulder member 38 is so fixed on each rod to contact a rod bushing 39 fixed in the sleeve 34 so as to prevent complete withdrawal of the rod from its sleeve 34 and yet allow sufficient movement of the rod to enable it to be withdrawn from the stud 33.

It was found exceedingly difficult to maintain the studs 33 securely in the matrixes 28 if the studs were threaded directly into the matrixes, due to the constant contraction and expansion of the metal of the matrixes. This was overcome by threading the inner extremities of the studs 33 into split bushings 40 with taper threads so that the bushings would be expanded into permanent gripping engagement with the metal of the matrixes.

It will be noted that, since the matrixes are only attached at their middles to their respective frame members, they are free to expand and contract in length at each side of their middle attachment, without interference. No other attachment is necessary, since the matrixes cannot move laterally due to the engagement of their shoulder portions 31 in the sockets 32.

The matrixes are heated by means of arcuate "Globars" or electric heating elements 41, each "Globar" substantially equaling in length the length of its respective matrix and being curvated to correspond to the outer circumference of the matrix. The heating elements 41 are positioned in the sockets 32 of the frame members in tight contact with their respective matrixes.

Each heating element is provided with an inclined angle bracket 42 adjacent each of its extremities. An attachment bolt 43 extends from each angle bracket. The two bolts 43 of each heating element incline toward each other at an acute angle to the outer circumference of the heating element and extend through angular walls of indented, V-shaped sockets 44, formed in the frame members 10, 13, and 14, there being one socket 44 indented outwardly at each extremity of each frame member.

The heating elements are constantly urged into tight contact with their respective matrixes by means of compression springs 45, one of which surrounds each of the bolts 43 in compressive relation between the angle bracket 42 and the wall of the socket 44. Suitable lock nuts 46 on the bolts 43 prevent the heating elements from falling inwardly when the matrixes are removed. It is desired to call attention to the advantages of the angular placement of the bolts 43. Since these bolts slant toward a tangent position relative to the arc of the heating elements, they allow free longitudinal expansion of the elements, due to thermal changes.

Since the various matrixes may vary in length due to errors in manufacture and due to variations in temperature, it would be impossible to always pull the two side matrixes together at the top by a non-adjustable device, for in some instances the matrixes would prevent the frame members from contacting, and in other instances the frame members would contact before the matrixes contact, thereby leaving a projecting fin or bead of rubber on the tread of the tire. The rotatable eccentric pin 24, however, allows the operator to bring the matrixes into perfect contact. The rotative position of the eccentric pin is visibly indicated by means of a pointer 26 on an index dial 27 mounted on the side frame member 13. The operator will note the position of the pointer 26 on the dial 27 for each set of matrixes, and will thereafter be able to quickly preset the device for any given set of matrixes.

In use, the casing 30 is expanded into the matrixes by means of a plurality of toggle arms 47 actuated from a jack screw 48 which can be rotated from a hand wheel 49. The toggle arms force segmental pressure shoes 50 against a resilient expansion band 51 which forces the tread portion of the casing into the matrixes. The jack screw 48 is mounted in a hinged bracket arm 52 which is hinged at 53 to the mid-portion of the lower frame member 10 so that the entire assembly of the internal expanding device may be swung sidewardly out of the embrace of the matrixes. A more complete description of the internal expanding device will be found in applicant's prior Patents Nos. 2,411,687 and 2,456,063. The expanding device, per se, forms no part of the present invention and is but briefly described herein.

It is desired to call particular attention to the construction of the matrixes. Each matrix is provided with a closed, hot air chamber 25 positioned between the heating element 41 and the tread design portion 29. The air in the chamber uniformly distributes the maximum portion of the heat directly to the tread design portion, where the greatest thickness of rubber is to be cured onto the casing. Heat is conducted from the hotter central portion outwardly to the two tapered side wall edges of the matrix in uniformly diminishing amount to properly cure the diminishing amount of rubber at the side walls. In this way the entire cross-section of tread rubber is uniformly cured in proportion to its thickness. Thus, overcuring of the side walls and undercuring of the thick tread is avoided.

While a specific form of the improvement has been described and illustrated herein, it is to be understood that the same may be varied, within the scope of the appended claims, without departing from the spirit of the invention.

Having thus described the invention, what is claimed and desired secured by Letters Patent is:

1. A tire molding device comprising: an arcuate, fixed, bottom frame member; a similar arcuate side frame member hinged to each extremity of said bottom frame member and cooperating therewith to form a complete circle; an arcuate tire tread matrix carried in each frame member; an arcuate heating element positioned between each frame member and its matrix; a withdrawable first pin in the extremity of one side frame member; a second pin in the extremity of the other frame member; a lever hingedly mounted on said second pin; a link pin in said lever; a connecting link mounted on and extending between said first pin and said link pin and acting to draw said frame members together as said lever is swung in one direction; and an eccentric portion on said first pin, said link being mounted on said eccentric portion so that rotation of said first pin will move the hinge axis of said link.

2. A tire molding device comprising: an arcuate, fixed, bottom frame member; a similar arcuate side frame member hinged to each extremity of said bottom frame member and cooperating therewith to form a complete circle; an arcuate tire tread matrix carried in each frame member; an arcuate heating element positioned between each frame member and its matrix; a withdrawable first pin in the extremity of one side frame member; a second pin in the extremity of the other frame member; a lever hingedly mounted on said second pin; a link pin in said lever; a connecting link mounted on and extending between said first pin and said link pin and acting to draw said frame members together as said lever is swung in one direction; an eccentric portion on said first pin, said link being mounted on said eccentric portion so that rotation of said first pin will move the hinge axis of said link; an indicating pointer extending radially from said first pin; and an indicating dial mounted upon one of said side frame sections in indicating relation to said pointer for indicating degrees of eccentricity of said first pin.

3. A tire molding device comprising: an arcuate, fixed, bottom frame member; a similar arcuate side frame member hinged to each extremity of said bottom frame member and cooperating therewith to form a complete circle; an arcuate tire tread matrix carried in each frame member; an arcuate heating element positioned between each frame member and its matrix; means for bringing said matrixes together in a complete circle; radially extending sleeves positioned upon opposite sides of the mid-portion of each frame section; a threaded rod in each sleeve; receiving means on each side of the mid-portion of each matrix receiving said rods for clamping the mid-portions of said matrixes to said frame members, the remaining portions of said matrixes being unattached; a medial shoulder formed on and projecting from the external surface of each matrix and extending circumferentially of said matrix; and a circumferentially extending pocket in each frame member receiving said shoulder and acting to maintain said matrixes in alignment with said frame members.

4. Means for securing an arcuate matrix in an arcuate frame member of a tire-molding device comprising: studs secured to opposite sides of the mid-portion of said matrix and projecting radially outward therefrom into receiving sockets in the adjacent frame member to circumferentially position said matrix, said studs having internally threaded sockets; and threaded rods extending radially through said frame member and being threaded into the sockets of said studs and acting to clamp the mid-portion of said matrix to said frame member, the extremities of said matrix being free to move circumferentially and radially under the effect of thermal changes.

References Cited in the file of this patent

UNITED STATES PATENTS

| | | |
|---|---|---|
| 1,643,712 | Henson | Sept. 27, 1927 |
| 1,899,258 | Bush | Feb. 28, 1933 |
| 1,996,971 | Murphy | Apr. 9, 1935 |
| 2,456,063 | James | Dec. 14, 1948 |
| 2,579,975 | Scott et al. | Dec. 25, 1951 |